United States Patent
Howe

[15] 3,682,186
[45] Aug. 8, 1972

[54] PIPELINE PUMP STATION BY-PASS
[72] Inventor: Ralph W. Howe, Houston, Tex.
[73] Assignee: Helmerich & Payne, Inc., Houston, Tex.
[22] Filed: Jan. 25, 1971
[21] Appl. No.: 109,209

[52] U.S. Cl. ............137/1, 137/268, 15/104.06, 134/8
[51] Int. Cl. .............................................B08b 9/04
[58] Field of Search........137/1, 268, 15 X; 134/22 C, 134/8; 15/104.06 A

[56] References Cited
UNITED STATES PATENTS

| | | | |
|---|---|---|---|
| 2,276,443 | 3/1942 | Wilson | 137/15 |
| 2,571,916 | 10/1951 | McKinley | 137/15 |
| 3,212,116 | 10/1965 | Gentry, Jr. | 137/268 X |
| 3,428,489 | 2/1969 | Gentry, Jr. | 15/104.06 A X |
| 3,524,466 | 8/1970 | Van Scoy | 15/104.06 A X |

Primary Examiner—M. Cary Nelson
Assistant Examiner—Robert J. Miller
Attorney—Ned L. Conley et al.

[57] ABSTRACT

A by-pass system and method for automatically passing a scraper by a pump station without substantially disturbing the operation thereof. The system may comprise a tubular interchange assembly installed in the main line between suction and discharge openings into suction and discharge piping. A header connected at opposite ends to the suction and discharge piping, respectively, may also be connected through a main side outlet to the interchange assembly. There may also be at least one other outlet connecting the header and interchange at a point downstream of the main outlet. Valves and controls therefor are located in the suction and discharge piping and header to switch the station inlet and station outlet to different locations so as to route an incoming scraper through the interchange and launch it downstream. Then the valves and controls are returned to normal operating positions.

22 Claims, 2 Drawing Figures

Patented Aug. 8, 1972 3,682,186
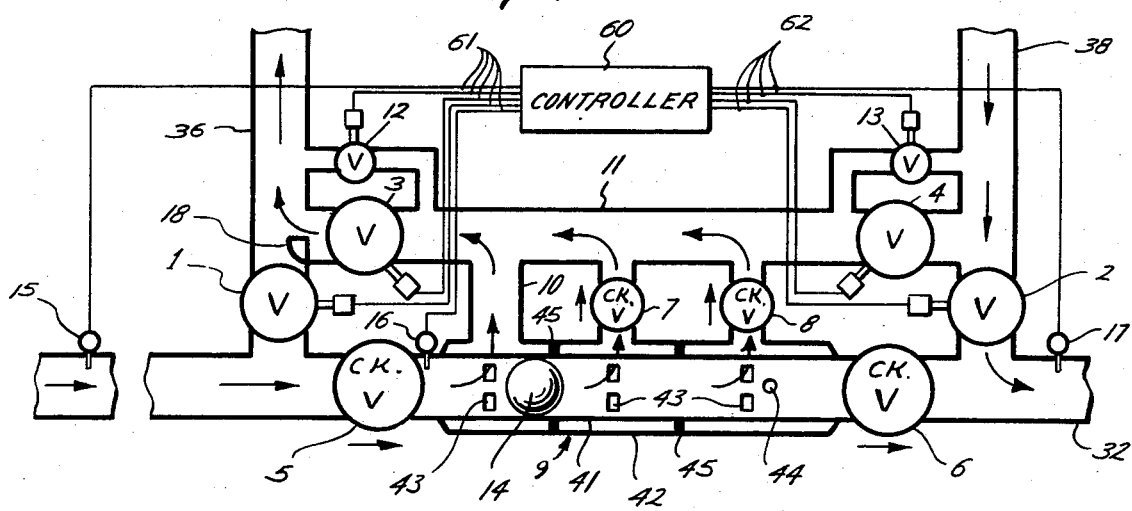
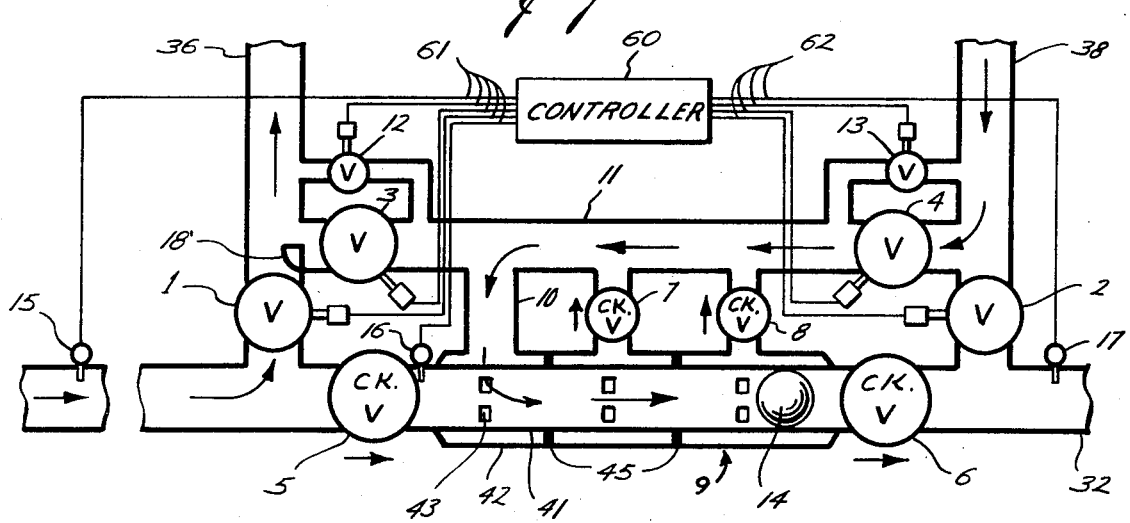
Ralph W. Howe
INVENTOR.
BY
Bill B. Berryhill
ATTORNEY

PIPELINE PUMP STATION BY-PASS

BACKGROUND OF THE INVENTION

1. Field of the Invention

The present invention is related to pipeline operations. More specifically, it concerns apparatus and methods for by-passing scrapers or product displacers around a pipeline pump or compressor station.

2. Description of the Prior Art

In both liquid and gas pipeline operations it is desirable to internally clean the pipeline on a regular basis. This is usually done by sending cylindrical shaped devices, called "scrapers" or "pigs," equipped with bushes and cutters through the line. These scrapers are provided with sliding seals engaging the pipeline wall so that the flowing stream carries them through the line. Another purpose for sending devices through a pipeline is to mechanically separate different products or to separate a liquid from a gas. When used for this purpose the devices are commonly called "displacers." They may be cylindrical or spherical in shape. Spherical displacers are usually made of an elastomeric material and are inflated to a size that provides a tight seal with the pipe so that they, too, may be propelled through the pipeline by its flowing stream.

Long pipelines usually have a number of booster stations at various intervals to provide the necessary pressure to force the liquid or gas through the pipeline at the desired flow rate. These stations comprise pumps or compressors, with their prime movers, together with the necessary station piping, controls and valves. When scrapers or displacers are passed through the pipeline, it is necessary either to provide means to remove the devices upstream of the stations and then re-insert them downstream, or to provide means to move the devices past the booster station without removing them from the line.

The most commonly accepted method of by-passing these scrapers or displacers past a booster station is to shut the station down, either by stopping the pumps or throttling the station discharge. This allows a check valve in the main line, between the station suction and discharge lines, to open, permitting the flowing stream to carry the device past the station. When it is past the station discharge line, the station is returned to normal operation. There are at least two severe disadvantages to this method:

a. Shutting down the station reduces the rate of flow in the pipeline. When several devices are passing through several booster stations, the effect on the operation and scheduling of the pipeline may be severe.

b. When displacers are being used for product separation in multi-product lines, the position of the displacer with respect to the separate product "batches" may be severely and adversely altered. This is because the entire volume of the station piping and that of the pumps remains behind while the station is shut down. When the station is started up again, this volume is pumped back into the line behind the displacer, contaminating the following batch of product. In large capacity pipeline systems, this station volume could be several hundred barrels. If this process is repeated at several booster stations, the product contamination represents a considerable loss to the pipeline carrier.

One method which has been used to by-pass scrapers and displacers without shutting the station down employs two separate suction lines, from the main line to the pump inlet, and two discharge lines, from the pump outlet to the main line. There are two main line check valves in this system. By alternately opening and closing the alternate suction and discharge valves, the devices can be transferred from the upstream to the downstream side of the station. A variation of this method is shown in U.S. Pat. Nos. 3,212,166 and 3,428,489. There are several disadvantages to this double suction and discharge line method:

a. The alternate suction and discharge lines serve as pockets that trap and hold the product from one batch of product that later mixes with and contaminates a following product.

b. The system is vulnerable to having a displacer block the suction to the pumps when the displacer passes the station suction line. In the past, this has caused repeated and costly damage to pipeline stations.

c. When electrical motor operators are used to operate the valves, a simple electrical component failure can cause valve operations that either block the pipeline stream, or release the high pressure on the discharge side of the station into the suction or low pressure side of the station. Either of these can cause severe damage.

SUMMARY OF THE INVENTION

The purpose of the station by-pass system of the present invention is to automatically pass scraper or displacer devices past a pipeline booster station without disturbing the normal operation of the station while the position of the device, with respect to the flowing stream of liquids or gasses is precisely maintained. This is to be done with a minimum of product contamination.

The by-pass system proposed to accomplish this purpose comprises a tubular interchange assembly installed between the suction and discharge openings from the main line into station suction and discharge piping, respectively. A header or combination suction/kicker line is installed adjacent to the interchange and connected at opposite ends to suction and discharge piping. The header and interchange are connected through a main side outlet and possibly one or more downstream outlets. The downstream outlets are provided with check valves allowing flow from the header to interchange but not in the opposite direction. There are scraper signals upstream and downstream There are scraper signals upstream and downstream of the station and in the interchange. There are valves on the suction and discharge piping adjacent their openings into the mainline and one or more valves on the header. On sensing the arrival of a scraper, the suction valve is closed and flow directed through the interchange and header into the suction piping. When the scraper enters the interchange, the suction valve is opened again, the discharge valve is closed and discharge flow routed through the header to a point upstream of the scraper. This launches the scraper downstream where the downstream signal causes the station discharge valve to open and all other valves to return to normal operating positions.

BRIEF DESCRIPTION OF THE DRAWING

For a detailed description of preferred embodiments of the invention reference will be made to the accompanying drawings, but these are only exemplary of the invention which can be varied by one skilled in the art. In the drawings:

FIG. 1 is a schematic representation of a by-pass system, according to a preferred embodiment of the invention, for automatically by-passing a scraper or displacer around a pump or compressor booster station and representing positions for normal operation and for receiving a scraper or displacer from upstream; and FIG. 2 is a schematic representation of a by-pass system as in FIG. 1, representing a position for launching a scraper or displacer in a pipeline, downstream of the booster station.

DESCRIPTION OF PREFERRED EMBODIMENTS

FIGS. 1 and 2 schematically represents the by-pass system, associated with a pump or compressor booster station, located at some point on a pipeline main line 32. Although no pump or compressor is shown in the drawing, the words "suction" and "discharge" represent the suction and discharge sides, respectively, of a pump or compressor. Of course, any number of pumps or compressors may be installed in series or parallel. The suction piping 36 and discharge piping 38 are connected to the main line 32 and by-pass system, which is the subject of this invention.

The by-pass system comprises several components including station suction and discharge valves 1 and 2, station by-pass interchange 9 and combination suction/kicker line 11. Station by-pass interchange 9 comprises an inner tube 41, of the same size as the main line 32, concentrically surrounded by a larger diameter outer sleeve 42. The sleeve 42 is welded at each end to inner tube 41 and to main outlet 10 and outlets into check valves 7 and 8. The inner tube 41 has ports 43 cut in it opposite each of these three side outlets. Small relief holes 44 are also drilled in tube 41 downstream of the downstream outlet. This would prevent a pressure buildup in the downstream end of interchange 9, eliminating the possibility of blocking a sphere at the position of the furtherest downstream ports 43. Annular rings 45 are placed in the annulus between inner tube 41 and sleeve 42, between the outlets, to prevent longitudinal flow in the annulus. Flanges may be welded on both ends of inner tube 41 to install the interchange assembly 9 between two main line check valves 5 and 6. The interchange 9 could be replaced by two or more flow through tees similar to the one shown in U.S. Pat. No. 3,524,466.

The combination suction/kicker line 11, or header as it might be called, is installed adjacent to interchange 9 and connects to all of the side outlets of interchange 9. The check valves 7 and 8 in the downstream side outlets allow flow only in a direction from the interchange 9 to header 11. Suction/kicker line 11 may be provided with flanges at each end for installation between a suction by-pass valve 3 and a discharge by-pass valve 4.

An internal check valve arrangement could be used as an alternative for the external downstream outlets and check valve (7, 8) arrangement shown. Such an arrangement would utilize gas compressor type check valves in ports 43 which would permit flow out of inner tube 41, but not back in. This arrangement would eliminate the need for check valves 7, 8, their respective outlets and the annular rings 45. However, it would function in the same manner. The only difference in flow would be that all flow would be through ports 45, the annulus surrounding tube 41 and main outlet 10. Such an arrangement would be particularly suitable for gas pipelines.

Small pressure equalizing solenoid valves 12, 13 and associated piping or tubing may be installed to by-pass the large valves 3 and 4 for quickly placing the interchange under station suction or discharge pressure as required. An eductor 18 may be installed in the main suction piping 36 where the suction/kicker line 11 ties in. This creates a low pressure area that induces flow through the interchange 9 when required. Station suction and discharge valves 1 and 2 complete the major components of the by-pass system.

Displacer/scraper detector switches 15, 16, 17 are installed upstream, downstream and in the interchange portion of the main line 32. These switches produce a control signal when displacer/scraper devices pass by them in the line.

Also shown in FIG. 1 is a controller, schematically represented at 60, connected to detector switches 15, 16, 17; station suction and discharge valves 1, 2; suction and discharge by-pass valves 3, 4; and pressure equalizing valves 12, 13 by conduits 61 and 62. Each of the valves 1, 2, 3, 4, 12 and 13 may be provided with operators. These valve operators and controls therefor may be electrically, hydraulically or pneumatically operated. The details of controller 60 will not be set forth herein since such controllers are known for electric, hydraulic or pneumatic operation, which may be adapted to the present system.

During normal station operation, the discharge by-pass valve 4 is closed and all other valves open. Upstream main line check valve 5 is open and, due to pressure differential, downstream main line check valve 6 is closed. There are several advantages afforded by the by-pass system during normal operation:

a. With the main station suction valve 1 and the suction by-pass valve 3 both open, the station has the lowest possible pressure drop in the suction piping resulting in maximum operating efficiency.

b. This arrangement, unlike presently used methods causes the entire interchange assembly 9, suction/kicker line 11 and station piping to be swept by the flowing stream so that no pockets or "dead ends" retain product from one batch to mix with and contaminate a following batch. This is especially important when, as is often done, batches of product are pumped through a pipeline with displacers therebetween.

c. Such an arrangement, unlike presently used methods, protects the station suction from being blocked by any scraper or displacer in the pipeline.

Now, the operation of the system for automatically by-passing scrapers and displacers will be described. With the pipeline station operating as described above, the arrival of a scraper or displacer, sphere 14 in this case, is first detected by detector 15. Detector 15 sends a signal to controller 60 which causes station suction valve 1 to close, forcing the entire stream through the interchange 9 and header 11, as indicated by the flow arrows in FIG. 1. The sphere 14 passes through the open main line check valve 5 and into the interchange 9 where it actuates detector switch 16. This sends a signal to controller 60, which causes station suction valve 1 to open again. When valve 1 is partially open a limit switch (not shown) sends a signal to controller 60 causing by-pass suction valve 3 to close. When valve 3 is closed a signal to controller 60 causes pressure equalizing solenoid valve 13 to open, raising the pressure in interchange 9 to the station discharge pressure level.

Simultaneously with the closing of by-pass suction valve 3, by-pass discharge valve 4 begins to open. When it is partially opened, controller 60 causes station discharge valve 2 to close. As valve 2 closes, the entire station discharge stream is diverted through interchange main outlet 10 as shown by the arrows in FIG. 2. This causes the sphere 14 to be moved through interchange 9 and to be launched into the downstream side of main line 32. As sphere 14 leaves the station, it actuates detector 17. Detector 17 signals controller 60 which reverses the sequence of valve operation, and restores the station to the normal operating condition.

The control sequence may be timed so that the trailing end of the leading product batch will have time to move through the pump and back into the interchange before the sphere 14 is launched downstream. This will assure accurate placement of sphere 14 at the interface with a minimum of product contamination. Furthermore, until sphere 14 passes the outlets to check valves 7 and 8 there is no way for the trailing product to be intermingled with the leading product. Once sphere 14 passes these outlets, as shown in FIG. 2, pressure is equalized on each side of the check valves 7 and 8, allowing sweeping or flushing flow therethrough, assuring a minimum of contamination.

As stated before, the valves 1, 2, 3, 4, 12 and 13 may be electrically, hydraulically or pneumatically controlled and operated. An interlock device may be interposed in the control system, between by-pass valves 3 and 4, which would make it impossible for both valves 3 and 4 to be partially or entirely open simultaneously. This would prevent the release of a high station discharge pressure into the suction side of the station. A single unitized transfer or diverter valve could be used to replace by-pass valves 3 and 4. It would be similar to the diverter described in U. S. Pat. No. 3,473,550. The diverter valve would be installed at the junction of main outlet 10 and header 11 and would be physically designed so as to never allow the suction side of the station to be subjected to discharge pressure. In other words, flow would be allowed either from main outlet 10 through the diverter into suction piping 36 or from discharge piping 38 and header 11 through the diverter into outlet 10, but never simultaneously.

In addition, an interlock device may be interposed in the controls of suction valve 1 and suction by-pass valve 3. This would make it impossible to have both valves closed at the same time, assuring that the station suction would not be blocked. The same feature could be incorporated in the operation of discharge valve 2 and discharge by-pass 4, so that the station discharge would never be blocked.

As previously mentioned, valve 1 could have a limit switch associated with it, so that when the suction valve 1 opens about thirty percent, after detector 16 is actuated by sphere 14, suction by-pass valve 3 begins to close. The same type of limit switch could be installed on discharge valve 2 so that when it has partially opened, after launching sphere 14, discharge by-pass valve 4 would begin to close. This would reduce the time for station by-pass sequence to an absolute minimum with safety.

The controller 60 would preferably be constructed with two decision making capabilities:

a. If a sphere passed the upstream detector 15 and entered the system, while another sphere was in the station by-pass system, the controller would do one of two things:
 1. If there were sufficient distance between the two spheres for the by-pass system to complete the sequence and return the system to a receive status, the controller would allow the sequence to proceed.
 2. If the spheres were too close together to allow time to complete the sequence, the controller would hold the system in the receive status until both spheres had entered the interchange. Then it would initiate the sequence to by-pass both spheres together.

b. If the upstream detector signaled more spheres than the by-pass interchange could accommodate, the controller would cause the station to be taken off the line until all of the spheres had passed the station. The station would then be restored to its original operating condition.

As can be seen from the foregoing discussion, the present invention offers several advantages over prior by-pass methods and systems. It operates with a minimum suction piping pressure drop, a minimum of product contamination, due to both speed of operation and elimination of pocket areas, and a maximum degree of safety and dependability. All of this is accomplished through automatic operation.

In the description of operations with the by-pass system herein described, the term "sphere" has been used. This term and the term "scraper," as used herein, should be understood to include scrapers and displacers of whatever shape and type regardless of the name given them. It should also be clear that this system might be used with both liquids and gases and with pumps or compressors. The term "pump" as used in the description and claims shall also include compressors.

Various embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the Abstract, is adopted solely for easier reading and understanding, and should not be considered in interpreting the scope of the invention claimed.

I claim:

1. In a pipeline pump station having suction piping and discharge piping connected to the main line of said pipeline at first and second branched openings thereof, a bypass system for automatically passing a scraper by said first and second branched openings comprising:

a tubular interchange assembly installed in said main line between said first and second branched openings;

a header connecting said suction and discharge piping and connected therebetween to said interchange assembly through a main side outlet;

a station suction valve in said suction piping between said first branched opening and the connection with said header;

a station discharge valve in said discharge piping between said second branched opening and the connection with said header; and valve means on said header movable from a first position, whereby flow is permitted between said interchange and said suction piping, to a second position whereby flow is permitted between said interchange and said discharge piping.

2. A by-pass system as set forth in claim 1, characterized in that said interchange assembly comprises: an inner tubular member and a larger diameter sleeve member concentrically therearound, said inner tubular member having port means through its wall through which flow communication may be established with said main side outlet.

3. A by-pass system as set forth in claim 2, characterized in that said port means comprises: a first set of ports adjacent said main side outlet and a second set of ports downstream thereof, said second set of ports being provided with means allowing flow through said second set of ports in one direction only.

4. A by-pass system as set forth in claim 2, characterized in that said port means comprises: a first set of ports adjacent said main side outlet and a second set of ports downstream thereof, said second set of ports being adjacent a second outlet which provides flow communication between said header and said interchange sleeve member, said second outlet being provided with means for permitting flow therethrough in one direction only.

5. A by-pass system as set forth in claim 4, characterized in that said means comprises a check valve permitting flow into said header only, an annular ring being installed in the annulus around said inner tubular member between said first and second set of ports, preventing longitudinal flow in the annulus between said inner tubular member and said sleeve member.

6. A by-pass system as set forth in claim 1, characterized in that said valve means comprises a first by-pass valve, between said main side outlet and said suction piping connection with said header, and a second by-pass valve, between said main side outlet and said discharge piping connection with said header.

7. A by-pass system as set forth in claim 1, characterized in that said valve means comprise a diverter valve at the junction of said header and said main side outlet.

8. In a pipeline pump station having suction piping and discharge piping connected to the main line of said pipeline at first and second branched openings thereof, a by-pass system for automatically passing a scraper by said first and second branched openings comprising:

a tubular interchange assembly installed in said main line between said first and second branched openings;

a header line connecting said suction and discharge piping and connected therebetween to said interchange assembly through a main side outlet;

a station suction valve in said suction piping between said first opening and said suction piping connection with said header;

a station discharge valve in said discharge piping between said second opening and said discharge piping connection with said header;

check valves at each end of said interchange permitting flow therethrough in a downstream direction only, and valve means on said header movable from a first position, whereby flow is directed through said main side outlet into said suction piping, and a second position, thereby flow is directed through said main side outlet from said discharge piping.

9. A by-pass system as set forth in claim 8, characterized by at least one other outlet connecting said interchange and said header downstream of said main outlet, said other outlet being provided with means for allowing flow from said interchange into said header but preventing flow in the opposite direction.

10. A by-pass system as set forth in claim 9, characterized in that said valve means comprises: a first by-pass valve between said main outlet and said suction piping connection and a second by-pass valve between said other outlet and said discharge piping connection, one of said by-pass valves being open and the other closed in said first position and vice versa in said second position.

11. A by-pass system as set forth in claim 10, characterized by limit means attached to said station suction valve and said first by-pass valve preventing both of said valves from being completely closed at the same time.

12. A by-pass system as set forth in claim 10, characterized by pressure equalizing means connecting both sides of at least one of said by-pass valves and operable on a signal to equalize the pressure on each side of said by-pass valve when said by-pass valve is closed.

13. A by-pass system as set forth in claim 8, characterized by an eductor installed at said suction piping connection.

14. A by-pass system as set forth in claim 8, characterized by signal means in said main line upstream of said first branched opening, downstream of said second branched opening and in said interchange assembly, said signal means being connected to a controller which is connected to and controls the operation of said station suction and discharge valves and said valve means, on receiving signals from said signal means.

15. A by-pass system associated with a pipeline pump station for automatically passing a scraper by a branched inlet, which permits flow from the main line of said pipeline into the suction piping of said pump station, and a branched outlet, which permits flow from the discharge piping of said pump station into said main line, comprising:

a tubular interchange assembly installed in said main line between said inlet and said outlet;

a tubular header connected at one end to said suction piping and at the other end to said discharge piping and connected through a main side outlet to said interchange assembly permitting flow from said interchange assembly into said suction piping;

first scraper signal means in said main line upstream of said branched inlet;

second scraper signal means in said interchange assembly;

third scraper signal means downstream of said branched outlet;

means controlled by said first signal means to block flow through said branched inlet but continuing to allow flow through said main side outlet into said suction piping;

means controlled by said second signal means to permit flow through said branched inlet, to block flow through said branched outlet, to block flow from said main side outlet into said suction piping and to allow flow from said discharge piping through said main side outlet into said interchange assembly; and means controlled by said third signal means to allow flow through said main side outlet into said suction piping and to allow flow from said discharge piping through said branched outlet.

16. A by-pass system as set forth in claim 15, characterized in that said means controlled by said first signal means comprises a station suction valve in said suction piping between said branched inlet and said one end of said header.

17. A by-pass system as set forth in claim 15, characterized in that said means controlled by said second signal means comprises valve means in said header movable from a first position whereby flow is permitted from said discharge piping to said interchange without connecting said suction and discharge piping at any time.

18. A by-pass system as set forth in claim 15, characterized in that said means controlled by said third signal means comprises a station discharge valve in said discharge line piping between said branched outlet and said other end of said header.

19. A by-pass system as set forth in claim 15, characterized by a controller connected to said first, second and third signal means, said controller also being connected to said means controlled by said signal means, said controller being provided with interlock means preventing the connection of said suction and discharge piping at all times and preventing the blocking of station suction or discharge at all times.

20. In pipeline operations involving a pump station, a method of passing a scraper by said pump station without substantially disturbing the operation thereof, comprising the steps of:

sensing the arrival of said scraper upstream from said station, switching the inlet of said station to a location downstream of its original location, sensing the passage of said scraper by said inlet original location, switching said station inlet back to its original location, switching the outlet of said station to a location upstream of its original location and upstream of said scraper, sensing the passage of said scraper by said outlet original location, and switching said station outlet back to its original location.

21. A method of passing a scraper by a pump station as set forth in claim 20, characterized in that prior to said switching of said station inlet back to its original location the following additional steps are taken:

sensing the arrival of a second scraper upstream from said station prior to witching said station inlet back to its original location, sensing the passage of said second scraper by said inlet original location, and in that prior to said switching of said station outlet back to its' original location the following additional step is taken:

sensing the passage of said second scraper by said outlet original location.

22. A method of passing a scraper by a pump station as set forth in claim 20, characterized in that prior to said switching of said outlet of said station to a location upstream of its original location enough time is allowed to elapse to permit the trailing end of the product arriving ahead of said scraper to pass through said pump station and back to said outlet original location.

* * * * *